United States Patent [19]

Nowak et al.

[11] Patent Number: 4,773,334
[45] Date of Patent: Sep. 27, 1988

[54] COMPOSITE FIBER TRUCK FOR A TRACK VEHICLE HAVING TORSION-ELASTIC CENTRAL PLATE MEMBER

[75] Inventors: Franz Nowak, Taufkirchen; Rolf Leo, Wertingen; Franz Hofer, Donauworth; Walter Oefner, Otterfing, all of Fed. Rep. of Germany

[73] Assignee: Messerschmitt-Bölkow-Blohm GmbH, Munich, Fed. Rep. of Germany

[21] Appl. No.: 34,772

[22] Filed: Apr. 3, 1987

[30] Foreign Application Priority Data

Apr. 16, 1986 [DE] Fed. Rep. of Germany ....... 3612797

[51] Int. Cl.⁴ .............................................. B61F 5/52
[52] U.S. Cl. ............................ 105/182.1; 105/199.1; 105/203; 267/3
[58] Field of Search ...................... 105/182.1, 185, 189, 105/199.1, 199.4, 200, 201, 203, 211, 217, 453, 208, 208.1, 208.2, 157.1; 267/3, 41, 148

[56] References Cited

U.S. PATENT DOCUMENTS

| | | | |
|---|---|---|---|
| 1,759,695 | 5/1930 | Harwick | 105/199.4 X |
| 2,023,715 | 12/1935 | Taylor | 105/203 |
| 2,040,262 | 5/1936 | Kruckenberg et al. | 105/189 X |
| 2,850,989 | 9/1958 | Kolesa | 105/200 |
| 3,913,495 | 10/1975 | Pelabon | 105/208 X |
| 4,357,879 | 11/1982 | Mohacsi et al. | 105/199.1 |
| 4,448,131 | 5/1984 | Weiland et al. | 105/182.1 |
| 4,526,109 | 7/1985 | Dickhart, III | 105/199.1 |

FOREIGN PATENT DOCUMENTS 0159946 10/1985 European Pat. Off. ............ 267/148

Primary Examiner—Robert B. Reeves
Assistant Examiner—Scott H. Werny
Attorney, Agent, or Firm—Kenyon & Kenyon

[57] ABSTRACT

In order to achieve in a truck for a track vehicle with an H-shaped truck frame which consists of a composite fiber structure serving the function of a primary spring, with two longitudinal beams connected to each other via transverse beams, a distribution of the loads of the truck frame suitable for composite fibers, the frame contains a torsion-elastic central plate member which couples the longitudinal beams to each other independently of the transverse beams, is designed in the truck plane as a frame stiffening element, is provided with load introduction points for the longitudinal and transverse support of the vehicle body and is designed as a bending-stiff composite fiber component for the transmission of longitudinal and transverse forces between the load introduction points and the longitudinal beams.

11 Claims, 3 Drawing Sheets

COMPOSITE FIBER TRUCK FOR A TRACK VEHICLE HAVING TORSION-ELASTIC CENTRAL PLATE MEMBER

BACKGROUND OF THE INVENTION

The present invention relates to a bogie or truck for a track vehicle with a truck frame having a composite fiber structure.

In a known truck of this type (German Patent No. 29 52 182), the truck frame of which consists of an H-shaped composite fiber structure which fulfills the purpose of a primary spring with two elastic longitudinal beams supporting the wheel-set axles and a transverse beam which connects the former centrally to each other and supports the vehicle body, and which, in operation, is subjected to very complex bending, shear, torsion and normal force stresses, the difficulty arises to design the transverse beam and particularly its corner joints to the longitudinal beams in a composite fiber type of construction meeting strength and stiffness requirements.

SUMMARY OF THE INVENTION

It is an object of the present invention to distribute in a truck of the claimed type, the loads over the truck frame in such a manner that it can be produced from composite fiber material in a simple manner as far as production is concerned.

The above and other objects of the invention are achieved by a truck for a track vehicle, in which the truck frame has two longitudinal beams which are connected to each other via transverse beam means and support at their ends wheel-set axles, said truck comprising a composite fiber structure which functions as a primary spring at least partially and is elastic in the region of the longitudinal beams but relatively rigid in the region of the traverse beam means, wherein the longitudinal beams are coupled to each other, independently of the traverse beam means by a torsionelastic central plate member comprising a frame stiffening element in the plane of the truck, stiff to shear stress and the plate member is provided with load introduction points for the longitudinal and transverse support of a carriage body and is designed for the transmission of longitudinal and transverse forces between the load introduction points and the longitudinal beams in a bending-resistant manner.

In the truck according to the invention, the composite fiber transverse beam or beams and the transverse beam corner joints are relieved of the longitudinal and transverse stresses resulting from linkage of the vehicle body and the mutual shear-stiff coupling of the longitudinal beams are at the same time taken over by the plate-shaped central part, and the central plate and the transverse beam form between the longitudinal beams several separate load transmission paths, each with specific stresses free of force superimpositions disturbing for composite fiber materials, whereby a design of the truck frame highly suitable for fiber composites is obtained and the fabrication of the composite fiber structure with the required strength and stiffness is facilitated quite substantially, especially in the area of the transverse beams including the transverse beam corner joints.

Due to the design of the truck frame according to the invention, the central plate part is subjected under load to stresses highly suitable for composite fibers, it is fabricated in a particularly preferred embodiment also of composite fiber material. In this case, the plate part consists, in view of a simple to-design embodiment with the required bending stiffness, advantageously of several composite-fiber layers with reinforcement ribs inserted between the layers, and a further simplification of the fabrication is achieved by providing pre-hardened composite fiber tubes as reinforcement ribs and the latter are manufactured as wound bodies.

An arrangement of the reinforcement ribs of the plate part particularly advantageous for taking up longitudinal and transverse forces is characterized by the design of the lateral plate end sections without reinforcement ribs. This is of particular advantage in view of the required torsional elasticity of the plate part.

In a further particularly preferred embodiment of the invention, the plate part contains a central recess taking up the king pin arrangement of the vehicle body, and at the lower end of the king pin arrangement, a stop extending beyond the central recess is fastened, whereby an emergency guidance of the king pin arrangement on the side of the vehicle body is, for one, provided in the center of the plate in case of a break of the steering rod provided for the longitudinal force transmission between the king pin arrangement and the central plate, and secondly, a truck lifting device which is operative when the vehicle body is lifted.

The bending moments acting on the central plate are reduced, preferably by the provision that at least one load introduction point is designed with several parts having one load introduction element arranged on the top side of the plate and one on the plate underside, so that the longitudinal and transverse forces transmitted between the vehicle body and the load introduction element cause in the central plate opposite bending moments which cancel each other at least in part. Thus, the load introduction point for the transverse support of the vehicle body is designed preferably of two parts, where a transverse shock absorber connected to the vehicle body is linked to the respective load introduction element on the underside of the plate, while the load introduction element on the top side of the plate supports a buffer which takes up the transverse excursion of the vehicle body resiliently.

Finally, the truck frame is designed in a particularly preferred manner, as a double-H-frame whereby a very shallow design of the truck frame and a simple installation of the central plate are made possible and, due to the doubling of the transverse beams, a further relief of each individual transverse beam and its associated corner joints is achieved. Due to an arrangement of the transverse beams close to the wheels, also the wheel braking devices can further be fastened in a load-effective manner directly to the front or rear transverse beam.

BRIEF DESCRIPTION OF THE DRAWINGS

The invention will now be explained in greater detail with the aid of an embodiment in conjunction with the drawings in which.

DETAILED DESCRIPTION

Figure 1:
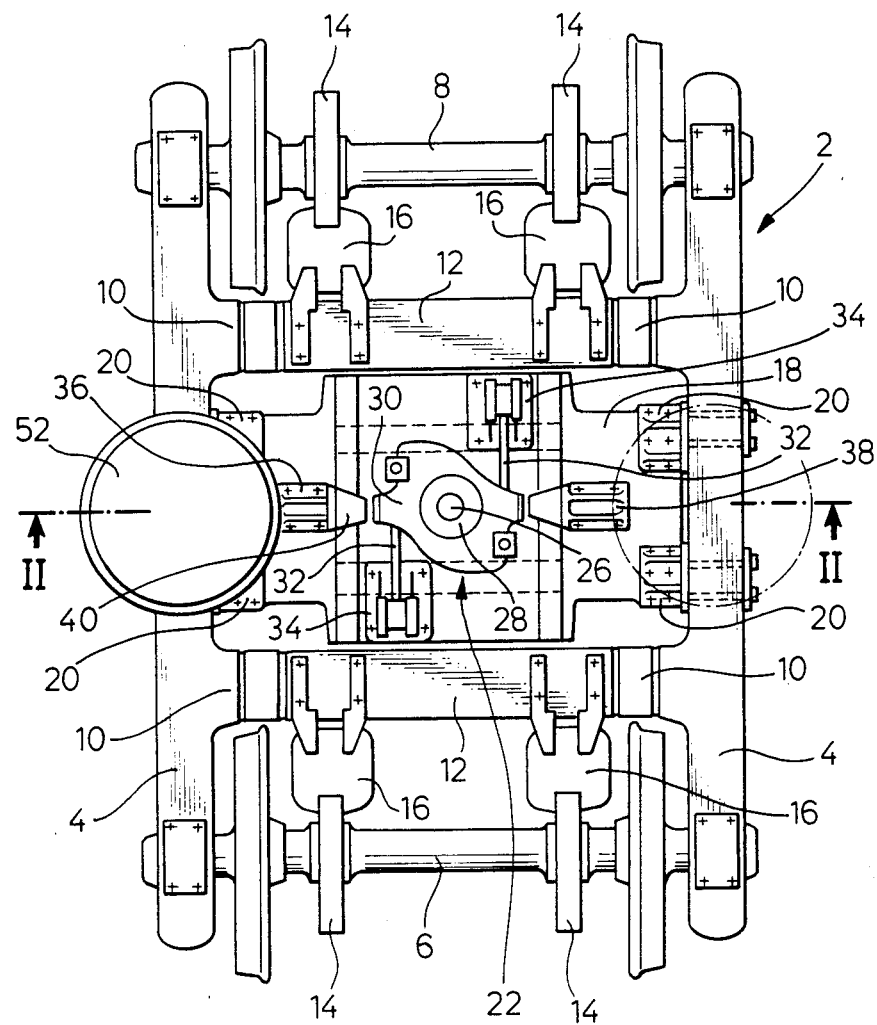
FIG. 1 shows a top view of a rail vehicle truck or bogie.
Figure 2:
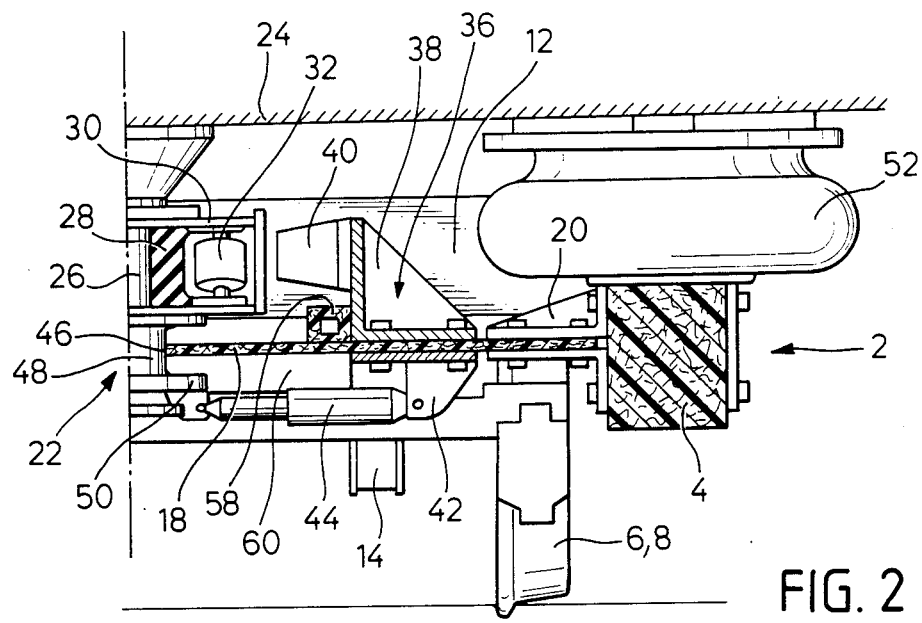
FIG. 2 shows a partial section along the lines II—II of FIG. 1.

The truck shown in FIGS. 1 and 2 contains a double-H truck or bogie frame 2 in the form of a composite fiber structure which, besides the support and guidance requirements, also fulfills the purpose of primary spring means, with two longitudinal beams 4 which have a defined elasticity behavior perpendicular to the truck plane, i.e., perpendicular to the plane of the drawing of FIG. 1 which changes in the longitudinal direction, and at the relatively elastic end sections of which the front and rear wheel set 6, 8 respectively, of the truck is supported. The longitudinal beams 4 are coupled to each other by two transverse beams 12 which are spaced from each other symmetrically to the center of the truck, are arranged close to the truck wheels and are integrally connected via corner joints 10 laterally to the longitudinal beams 4. Each of the transverse beams 12 consists of a relatively torsion-elastic composite wound fiber body which, however, is stiff to shear stress in the bending and truck plane. To the transverse beams 12 are fastened the disc brake devices 16 which cooperate with the brake discs 14 of the wheel sets 6, 8.

The composite fiber frame 2 further contains a central plate part 18 which is arranged between the transverse beams 12, is designed as a frame-stiffening element and is connected via very stiff metal fittings 20 laterally to the longitudinal beams 4, and couples them together in a shear-stiff manner independently of the transverse beams. The plate part 18 which likewise consists of composite fiber material and accordingly has a high corrosion and good sound dampening properties, serves for the transmission of the longitudinal and transverse forces between the vehicle body king pin arrangement 22 and the longitudinal beams 4 of the truck frame 2.

The king pin arrangement 22 contains a central pivot post 26 which is fastened to the underside of the vehicle body 24 and is supported via an elastomer bearing 28 with limited rotation in a cross piece 30, which is pivotally connected to two longitudinal steering rods 32 arranged on both sides of the king pin 26 and each of which is connected pivotally to a pillow-block-like load introduction point 34 fastened to the central plate part 18. In this manner the longitudinal forces resulting from the vehicle body linkage and which act in the plane of the truck are transmitted via the rotary post 26, the elastomer bearing 28, the cross piece 30 and the longitudinal steering rod 32 to the load introduction points 34 and are taken up by the central plate part 18.

The transverse bracing of the vehicle body relative to the truck is accomplished via two-piece load introduction points 36 which are likewise fastened to the central plate part 18 and each consist of a load introduction element 38 fastened to the upper side of the plate with a buffer 40 resiliently taking up the transverse excursions of the cross piece 30, as well as of a load introduction element 42 which is arranged on the underside of the plate and is connected via a transverse shock absorber 44 (FIG. 2) to the lower end section 48 of the king pin arrangement 22 which goes through a central recess 46 of the central plate part 18. The transverse forces which result from the vehicle body linkage and are effective in the truck plane, are thus introduced on the one hand via the cross piece 30, the buffers 40 and the load introduction elements 38 and, on the other hand, via the transverse shock absorbers 44 and the load introduction elements 42 in the form of oppositely directed bending moments which cancel each other, at least partially, at the respective load introduction point 36, into the central plate part 18.

The king pin end section 48, together with the recess 46 of the central plate part 18 forms an emergency guide for the case that the longitudinal or transverse support of rhe vehicle body 24 at the truck fails, for instance, in the event of a break of the longitudinal steering rod 32, and is further provided at its lower end with an enlargement 50 which extends beyond the recess 46 and by which it is assured that, if the vehicle body 24 is raised, the entire truck is then also lifted at the enlargement 50 striking the underside of the central plate part 18.

The support of the vehicle body at the truck perpendicularly to the plane of the truck is accomplished via air cushions 52 arranged between the vehicle body 24 and the longitudinal beams 4, and vertical shock absorbers (not shown).

Figure 3:
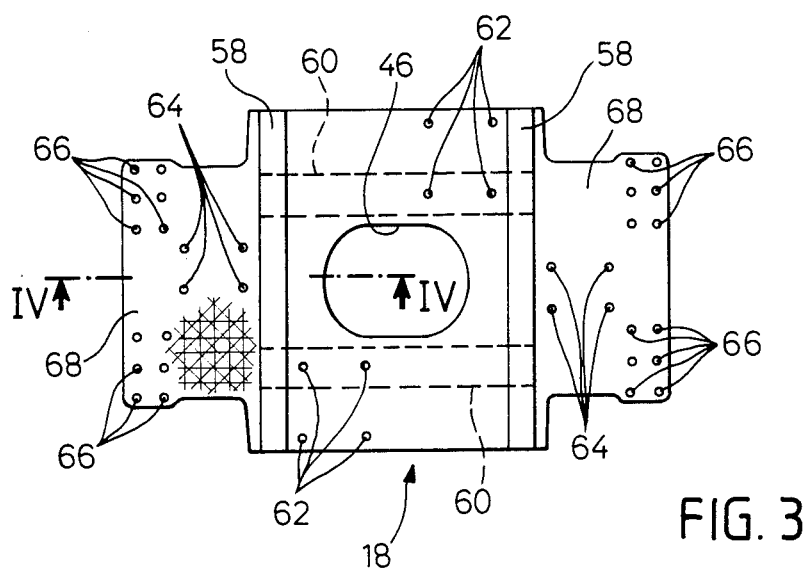
FIG. 3 shows a top view of the central composite fiber plate of the truck frame.
Figure 4:
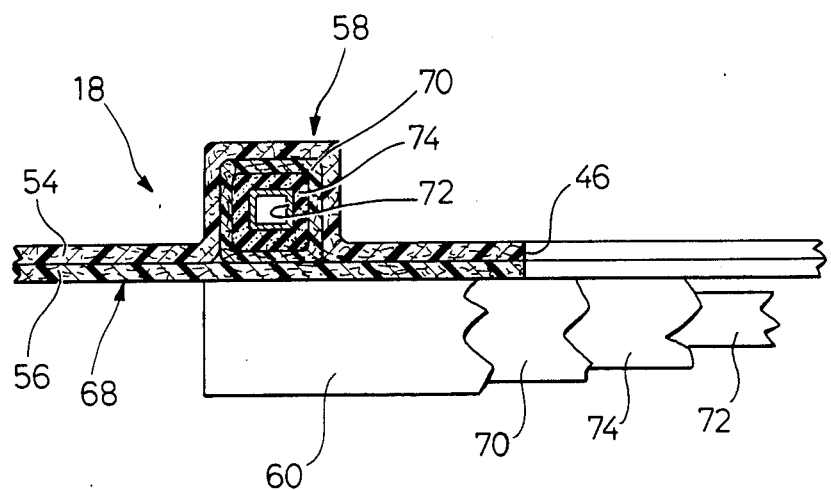
FIG. 4 shows a partial section along the lines IV—IV of FIG. 3.

The central plate part 18 which fills most of the interior of the double-H-shaped composite fiber frame 2 and assures the shear stiffness of the latter in the truck plane, is designed, according to FIGS. 3 and 4, as a composite fiber plate consisting of two composite fiber layers 54 and 56 with multiply different fiber orientation, i.e., their reinforcement fibers run, for instance, at 0°, 90° and ±45° as indicated by the cross-hatching in FIG. 3; it accordingly has quasi isotropic fiber orientation, i.e., it has in all directions substantially the same strength and stiffness properties in the horizontal plane, and therefore, in the truck plane.

Since the longitudinal and transverse force support of the vehicle body 24 via the load introduction points 34, 36 cannot take place in the plate plane and therefore, the horizontal central plate part 18 is stressed by a bending moment, it is reinforced by longitudinal and transverse ribs 58, 60. The longitudinal ribs 58 are located on the upper side of the plate and extend parallel to each other continuously from the front to the rear plate edge laterally close to the central recess 46 and in the immediate vicinity of the respective fastening holes 62 for the longitudinal force introduction points 34, while the transverse ribs 60 which are shown dashed in FIG. 3, are located on the underside of the plate and extend likewise parallel to each other immediately next to the central recess 46 only over the central region of the plate and end at the longitudinal ribs 58 and the respective fastening holes 64 for the transverse force introduction point 36, so that the lateral end sections 68 of the composite fiber plate 18 which are connected via the fastening holes 66 for the metal fittings 20 to the longitudinal beams 4 are designed without reinforcement ribs, and the plate 18 has therefore a sufficiently high torsional elasticity for twisting of the truck frame about the transverse axis.

As shown in FIG. 4, the reinforcement ribs 58, 60 are formed by a hat-profile-like design of the upper and lower composite fiber layer 54, 56, where a composite fiber tube 70 of carbon fibers is inserted into the interior of these hat-profile like stiffeners; because of the required bending and torsion stiffness, the tube 70 is wound of a first half-set of carbon fibers running unidirectionally in the longitudinal rib direction, and of a second half-set of carbon fibers running at ±45° to the longitudinal rib direction on a foam material core 74 surrounding a square hollow profile member 72. For fabricating the composite fiber plate 18, the composite fiber tubes 70 are wound first and are hardened and then, the composite fiber layers 54 and 56 are prepackaged, placed around the composite fiber tubes 70 and are subsequently hardened while they are enclosed in a die together with the tubes 70, whereupon the plate 18 is mechanically machined and drilled.

In the foregoing specification, the invention has been described with reference to, a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A truck for a track vehicle, in which the truck frame has two longitudinal beams which are connected to each other via transverse beam means and support at their ends wheel-set axles, said truck comprising a composite fiber structure which functions as primary spring means at least partially and is elastic in the region of the longitudinal beams but relatively rigid in the region of the transverse beam means, wherein the longitudinal beams are coupled to each other stiff to shear stress, independently of the transverse beam means by a torsion-elastic central plate member comprising a composite fiber material constructed as a frame stiffening element in the plane of the truck and the plate member is provided with load introduction points for the longitudinal and transverse support of a carriage body and is bending-resistant for the transmission of longitudinal and transverse forces between the load introduction points and the longitudinal beams, said plate member comprising several composite fiber layers with reinforcement ribs inserted between the layer.

2. The truck recited in claim 1, wherein prehardened composite fiber tubes are provided as the reinforcement ribs.

3. The truck recited in claim 2, wherein the composite fiber tubes are produced as wound bodies.

4. The truck recited in claim 1, wherein longitudinal and transverse ribs are provided as reinforcement ribs for the plate member.

5. The truck recited in claim 4, wherein the plate member is generally rectangular in form with small rectangular pieces having been removed from the four corners of the plate, whereby the plate has a square middle portion and right and left end sections of narrower width, said plate also having a central recess, and wherein the longitudinal ribs extend parallel to each other continuously from the front to the rear plate edge, while the transverse ribs extend continuously only over the middle portion of the plate member and the plate end sections connected to the longitudinal beams are made without reinforcement ribs.

6. The truck recited in claim 1, wherein the plate member comprises a central recess receiving the king pin arrangement of the vehicle body, and the king pin arrangement is provided at its lower end section passing through the recess with an enlargement which strikes the underside of the plate member if the vehicle body is lifted and thereby also lifts the truck.

7. The truck recited in claim 1, wherein at least one load introduction point comprises several parts with a load introduction element on the top side of the plate member and a further load introduction element opposite thereto on the underside of the plate member.

8. The truck recited in claim 7, wherein the load introduction points for the transverse support of the vehicle body are made of two parts and a transverse shock absorber connected to the vehicle body is linked to the load introduction element on the underside of the plate member, while the load introduction element on the top side of the plate member is provided with a buffer which limits the transverse play of the vehicle body resiliently.

9. The truck recited in claim 1, wherein the truck frame has a front and a rear transverse beam and the plate member is arranged horizontally between the two transverse beams.

10. The truck recited in claim 9, wherein the transverse beams are arranged close to the wheel at the front and rear wheel set, and wheel set braking devices are mounted to the transverse beams.

11. A truck for a track vehicle, in which the truck frame has two longitudinal beams which are connected to each other via transverse beam means and support at their ends wheel-set axles, said truck comprising a composite fiber structure which functions as primary spring means at least partially and is elastic in the region of the longitudinal beams but relatively rigid in the region of the transverse beam means, wherein the longitudinal beams are coupled to each other, stiff to shear stress, independently of the transverse beam means by a separate torsion-elastic central plate member attached by metal fittings to be arranged horizontally between the transverse beam means and constructed as a frame stiffening element in the plane of the truck, and the plate member is provided with load introduction points for the longitudinal and transverse support of a carriage body and is bending-resistant for the transmission of longitudinal and transverse forces between the load introduction points and the longitudinal beams.

* * * * *